(12) United States Patent
Joffe et al.

(10) Patent No.: US 6,938,132 B1
(45) Date of Patent: Aug. 30, 2005

(54) MEMORY CO-PROCESSOR FOR A MULTI-TASKING SYSTEM

(75) Inventors: Alexander Joffe, Palo Alto, CA (US); Asad Khamisy, Fremont, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 151 days.

(21) Appl. No.: 10/117,779

(22) Filed: Apr. 4, 2002

(51) Int. Cl.$^7$ .............................................. G06F 12/00
(52) U.S. Cl. ...................... 711/156; 711/154; 711/155; 711/4; 711/115; 710/100; 710/105
(58) Field of Search ............................ 711/154–156, 4, 711/115, 118, 138, 117, 167; 710/100, 105, 52; 709/250; 714/6

(56) References Cited

U.S. PATENT DOCUMENTS

| | | | | |
|---|---|---|---|---|
| 3,905,023 | A | * | 9/1975 | Perpiglia ........................ 714/6 |
| 5,339,443 | A | | 8/1994 | Lockwood ................... 710/244 |
| 5,469,558 | A | * | 11/1995 | Lieberman et al. .......... 710/105 |
| 5,790,881 | A | | 8/1998 | Nguyen .................. 395/800.34 |
| 6,065,103 | A | * | 5/2000 | Tran et al. ................... 711/156 |
| 6,112,255 | A | * | 8/2000 | Dunn et al. ..................... 710/7 |
| 6,173,358 | B1 | * | 1/2001 | Combs ........................ 711/100 |
| 6,237,019 | B1 | | 5/2001 | Ault et al. ................... 718/104 |
| 6,330,626 | B1 | * | 12/2001 | Dennin et al. ................. 710/52 |
| 6,338,108 | B1 | | 1/2002 | Motomura ................... 710/110 |
| 6,665,755 | B2 | * | 12/2003 | Modelski et al. ............ 710/100 |
| 2002/0186661 | A1 | * | 12/2002 | Santiago et al. ............. 370/252 |
| 2003/0061443 | A1 | * | 3/2003 | Frank et al. ................. 711/118 |

OTHER PUBLICATIONS

U.S. Appl. No. 10/117,781, filed Apr. 4, 2002, Alexander Joffe.
U.S. Appl. No. 10,117,780, filed Apr. 4, 2002, Alexander Joffe.
U.S. Appl. No. 10,103,436, filed Mar. 20, 2002, Nathan Elnathan.
U.S. Appl. No. 10,103,393, filed Mar. 20,2002, Nathan Elnathan.
U.S. Appl. No. 10,103,415, filed Mar. 20, 2002, Ilan Pardo.
U.S. Appl. No. 10/117,394, filed Apr. 4, 2002, Alexander Joffe.
U.S. Appl. No. 10,117,452, filed Apr. 4, 2002, Alexander Joffe.

* cited by examiner

Primary Examiner—Matthew Kim
Assistant Examiner—Zhuo H. Li
(74) Attorney, Agent, or Firm—Silicon Valley Patent Group LLP

(57) ABSTRACT

A co-processor (also called "memory co-processor") provides an interface to a memory, by executing instructions on data held in the memory. The co-processor uses a specified address to fetch data from memory, performs a specified instruction (such as incrementing a counter or policing) on the data to obtain modified data, and writes the modified data back to memory at the same address. Depending on the embodiment, the memory co-processor may include a first buffer for holding instructions that may be received back to back, in successive clock cycles. Instead of or in addition to the first buffer, the memory co-processor may include a second buffer for holding data to be written to memory back to back, in successive clock cycles. In some embodiments, the memory co-processor also receives (and maintains in local storage) the identity of a task that generates the specified instruction, so that the same cask may be awakened after the instruction has been executed.

16 Claims, 12 Drawing Sheets

| X | A1 | A2 | A3 | A4 | A5 | A6 | A7 | A8 | A9 | RA1 | RA2 | RA3 | RA4 | RA5 | RA6 | RA7 | RA8 | RA9 | A10 | A11 | A12 | A13 |
|---|----|----|----|----|----|----|----|----|----|-----|-----|-----|-----|-----|-----|-----|-----|-----|-----|-----|-----|-----|
| Y | - | - | - | - | - | - | - | - | D1 | D2 | D3 | D4 | D5 | D6 | D7 | D8 | D9 | - | - | - | - | - |
| MA | - | - | - | - | A1 | A2 | A3 | A4 | A5 | A6 | A7 | A8 | A9 | A1 | A2 | A3 | A4 | A5 | A6 | A7 | A8 | A9 |
| R/W | - | - | - | - | R | R | R | R | R | R | R | R | R | W | W | W | W | W | W | W | W | W |

No reads bracket spans RA1–RA9.

FIG. 4B

| X | A14 | A15 | A16 | A17 | A18 | RA10 | RA11 | RA12 |
|---|-----|-----|-----|-----|-----|------|------|------|
| Y | - | - | - | - | D10 | D11 | D12 | D13 |
| MA | A10 | A11 | A12 | A13 | A14 | A15 | A16 | A17 |
| R/W | R | R | R | R | R | R | R | R |

No reads bracket spans RA10–RA12.

FIG. 4C

MEMORY CO-PROCESSOR FOR A MULTI-TASKING SYSTEM

CROSS REFERENCE TO RELATED APPLICATIONS

This application is related to and incorporates by reference herein in their entirety the following U.S. patent application(s):

(U.S. patent application Ser. No. 10/103,436) entitled "Dynamic Allocation of Packets to Tasks," Nathan Elnathan et al., filed on Mar. 20, 2002.

(U.S. patent application Ser. No. 10/103,393) entitled "Reordering of Out-of-Order Packets," Nathan Elnathan, filed on Mar. 20, 2002.

(U.S. patent application Ser. No. 10/103,415) entitled "Asymmetric Coherency Protection," Ilan Pardo, filed on Mar. 20, 2002.

(U.S. patent application Ser. No. 10/117,394) entitled "Method and Apparatus to Suspend and Resume on Next Instruction for a Microcontroller," Alexander Joffe, filed concurrently herewith.

(U.S. patent application Ser. 10/117,452) entitled "METHOD AND APPARATUS FOR ISSUING A COMMAND TO STORE AN INSTRUCTION AND LOAD RESULTANT DATA IN A MICROCONTROLLER," Alexander Joffe et al., filed concurrently herewith.

(U.S. patent application Ser. No. 10/117,781) entitled "Logic for Synchronizing Multiple Tasks at Multiple Locations in an Instruction Stream," Alexander Joffe et al., filed concurrently herewith.

(U.S. patent application Ser. No. 10/117,780) entitled "Sequencing Semaphore," Alexander Joffe et al., filed concurrently herewith.

CROSS REFERENCE TO ATTACHED APPENDIX

Appendix A contains the following files in one CD-ROM (of which two identical copies are attached hereto), and is a part of the present disclosure and is incorporated by reference herein in its entirety:
Volume in drive D is 020329_1606
Volume Serial Number is 2AC6-332D
Directory of d:\
Mar. 29, 2002 04:06p<DIR>
Mar. 29, 2002 04:06p<DIR>
Mar. 28, 2002 02:31p 365,686 MEMCOP.TXT
Mar. 28, 2002 02:33p 219,262 UCEXEC.TXT
  4 File(s) 584,948 bytes
  0 bytes free The files of Appendix A form source code of computer programs and related data of an illustrative embodiment of the present invention.

A uCexec.txt file describes the behavioral model of circuitry in a microcontroller's execution unit to decode and execute an instruction to provide a store-and-load command to a memory co-processor.

A MemCoP.txt file describes the behavioral model of circuitry of the memory co-processor, which is also known as a special processing unit (SPU).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A number of tasks executing in a microcontroller may use a semaphore (see FIG. 1A) as a synchronization mechanism, to access a common location in memory, to ensure that data at that location is not changed by one task while that data is being used by another task. Use of such a semaphore ensures, for example, that a packet counter is properly incremented (or a database entry is properly accessed) by each of a number of tasks that execute concurrently or simultaneously in the microcontroller.

In using a semaphore, when one task, e.g. Task0 in FIG. 1B, is accessing a memory location, other tasks, e.g. Task1, Task2, and Task3, that also need to access that same memory location are suspended (i.e. are made to wait). While such other tasks are waiting, Task0 may be activated from sleep (e.g. Task0 may have been previously put to sleep at time t4 soon after issuance of a request for the semaphore and may be awakened only at time t8), Task0 may issue a read request on being awakened, may again be put to sleep while waiting for a response from memory (e.g. at time t9), may again be awakened on receiving the memory response (e.g. at time t10), perform a read operation, and finally release the semaphore (e.g. at time t10). Only at this point is the semaphore available for use by the next task, Task1.

Therefore, use of a semaphore effectively single threads the access to a common memory location in all of the tasks, even though a microcontroller (such as a network processor) may support multitasking. Such single threading causes the latency of each task to affect all subsequently-performed tasks. Note that in addition to latency inherent in memory, latency may be added by the presence of memory management hardware (also called "load store unit" abbreviated as LSU), as illustrated in FIG. 1C.

U.S. Pat. No. 5,790,881 granted to Nguyen on Aug. 4, 1998 entitled "Computer system including coprocessor devices simulating memory interfaces" suggests (see abstract) "coupling a coprocessor to a master device, in which the coprocessor emulates an memory interface to the master device, like that of a memory device. . . . The coprocessor is disposed to receive data written from the master device, perform a coprocessing function on that data, and respond to a read data command from the master device with processing results."

See also U.S. Pat. No. 6,338,108 granted to Motomura on Jan. 8, 2002 entitled "Coprocessor-integrated packet-type memory LSI, packet-type memory/coprocessor bus, and control method thereof" which states (see abstract) that "[a]memory section and coprocessor sections in a coprocessor-integrated packet-type DRAM are provided with unique memory device ID and coprocessor device IDs respect-vely . . . "

SUMMARY

The present invention relates to a co-processor (also called "memory co-processor") that provides an interface to a memory, e.g. by sequentially executing instructions on data held in the memory. Each instruction (such as a "read-modify-write" instruction) to be executed by the co-processor is supplied in a command, along with an address in memory where the data is stored. In one embodiment, the command is assembled by a microcontroller, which may be, for example, a network processor. By performing only one command at a time, the memory co-processor effectively performs a semaphore function, e.g. when multiple commands to access the same location in memory are received, the accesses are performed sequentially. Even though only one command is performed at a time, the performance of such a command is pipelined in certain embodiments to increase throughput.

Moreover, a memory co-processor of some embodiments includes local storage so that two or more instructions can be performed back to back in successive clock cycles, despite latency of the memory. Specifically, the just-described memory co-processor includes a number of storage elements (also called "address-data buffer" to temporarily hold addresses and data (also called "modified data") obtained by execution of recent instructions, while the modified data is being written to memory.

When executing each instruction, the address-data buffer is checked, and if a memory address as found in the address-data buffer, the corresponding data from the address-data buffer is used. Such use of data from the address-data buffer eliminates the possibility that stale data from memory may be used, e.g. if a read for data (so be used in an instruction being executed in the current clock cycle) was issued several clock cycles ago, and new data has been written to memory in a clock cycle immediately preceding the current clock cycle.

When present, the address-data buffer is of a sufficient size (greater than or equal to the number of clock cycles of latency in writing the modified data to memory). In some embodiments, the storage elements of an address-data buffer in such a memory co-processor are organized in a First-In-First-Out (FIFO) manner, although other organizations may be used in other embodiments.

Depending on the type of command (e.g. whether the command is "store-and-load" or simply "store"), the memory co-processor may or may not provide the modified data (also called "result") to a microcontroller that supplied the command. In some embodiments, the memory co-processor also provides to the microcontroller, in addition to the result, an identifier of a task in the microcontroller, so that the task may be awakened, and the task may then use the result. In such embodiments, the memory co-processor receives, in addition to the instruction and the memory address, the identifier of a task that issues the instruction.

Furthermore, in certain embodiments, instead of or in addition to the above-described data buffer, the memory co-processor may have a buffer (hereinafter "command buffer") in which a corresponding number of commands (along with their specified addresses) may be temporarily held, while the instruction of one such command is being executed.

BRIEF DESCRIPTION OF THE DRAWINGS

FIGS. 4B and 4C illustrate, in timing charts, a sequence of events when a number of read-modify-write instructions are performed back to back (e.g. every two clock cycles) by the memory co-processor implementation of FIG. 4A.

DETAILED DESCRIPTION

Figure 2A:
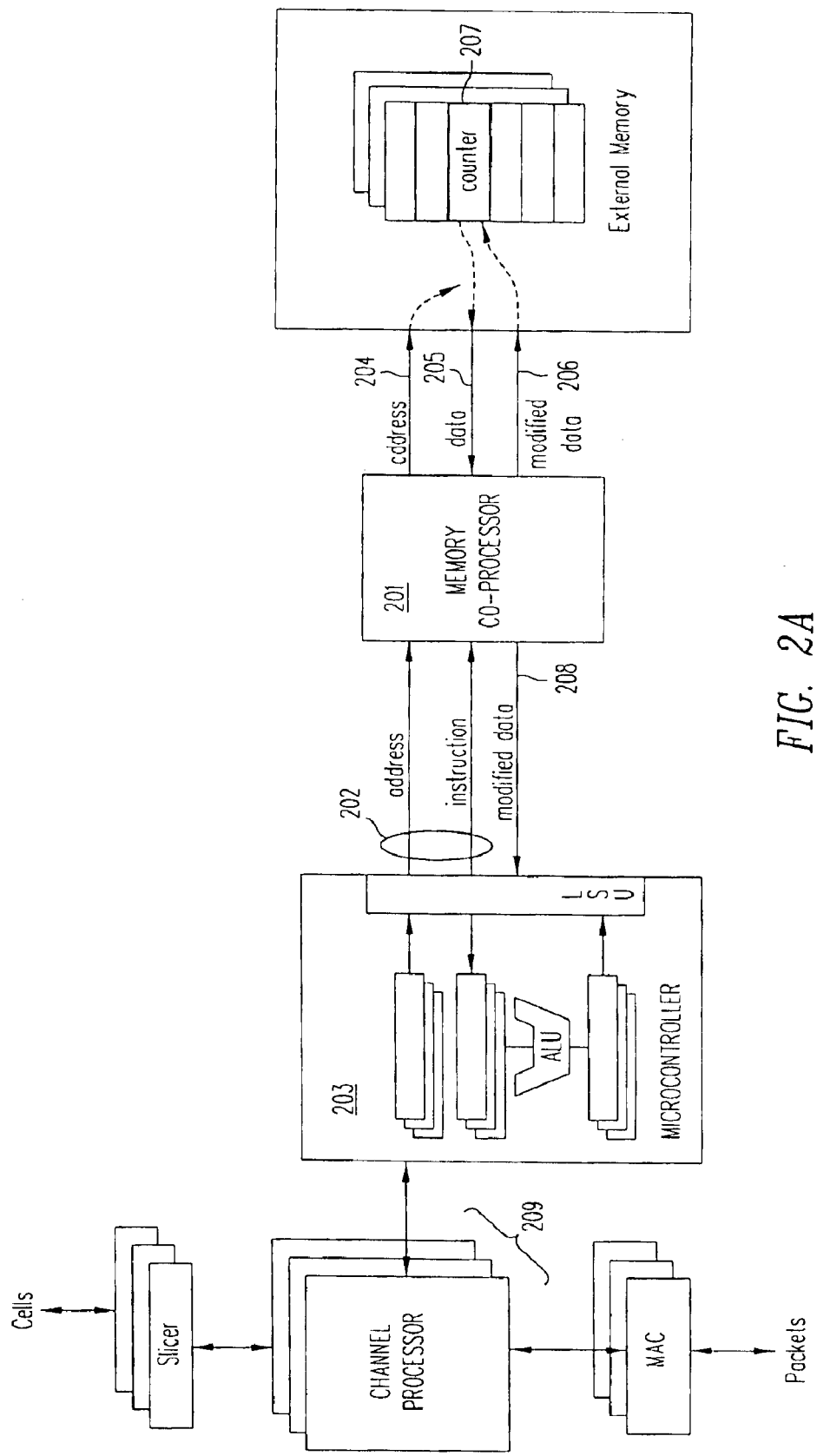
FIG. 2A illustrates, in a block diagram, use of a memory co-processor to interface a microcontroller to external memory, in accordance with the invention.

A co-processor (also called "memory co-processor") 201 (FIG. 2A) provides an interface to external memory, e.g. by executing instructions (or functions) on data that is held in the external memory. Each instruction (such as a "read-modify-write" instruction or a policing function) to be executed by co-processor 201 is supplied on a bus 202 (also called "command bus") along with an address of a location 207 in external memory where the data is held.

In one embodiment, a "store-and-load" command is prepared by a microcontroller 203, which may be, for example, a network processor. The "store-and-load" command is described in detail in the above-described patent application, Ser. No. 10/117,452 incorporated by reference above. Therefore, passing a single command to a memory co-processor (such as "store-and-load" command) can result in an entire policing function (which includes several instructions) to be performed off-chip, which in turn reduces the time spent in the relevant task's critical section.

Figure 2B:
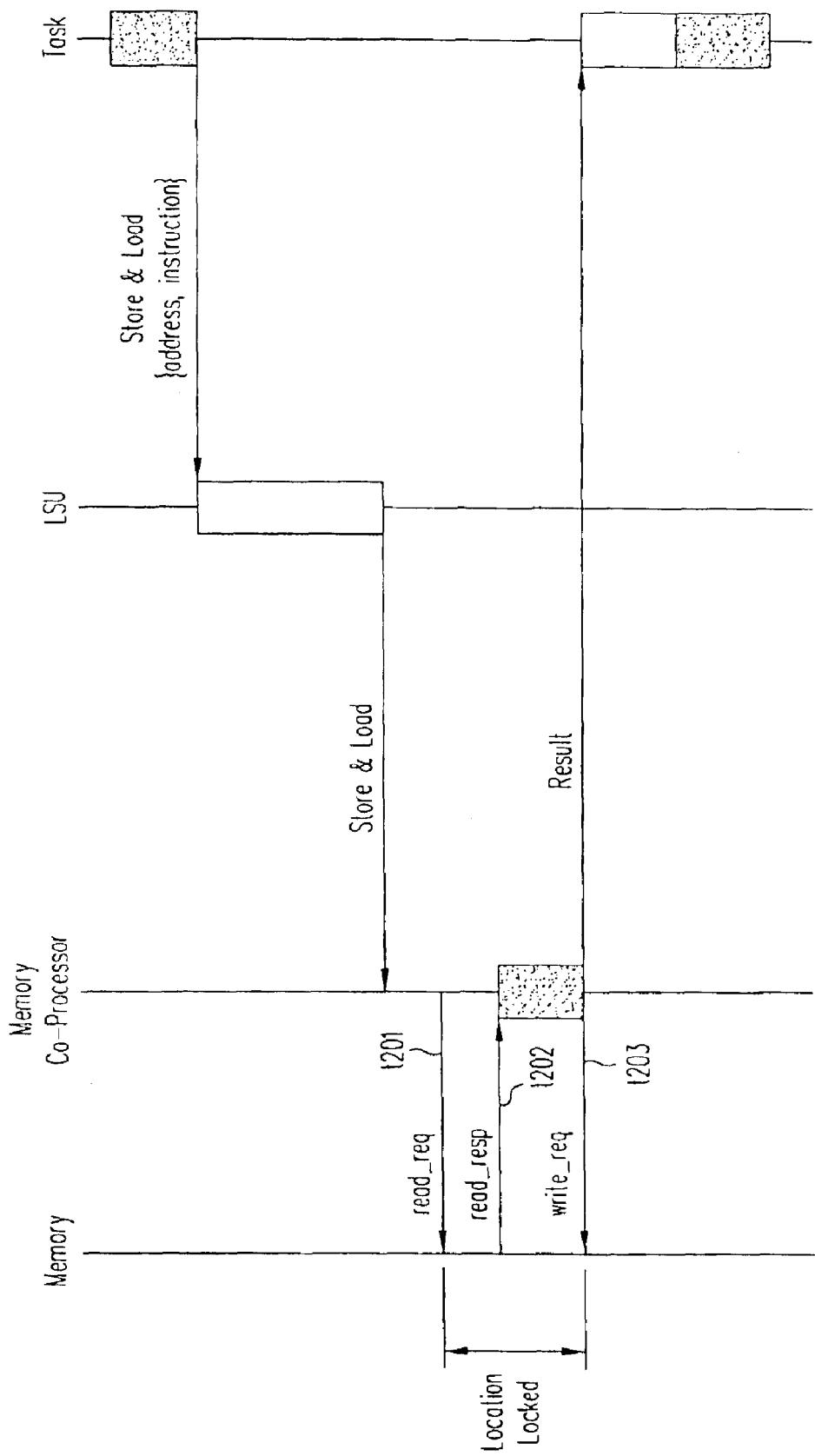
FIG. 2B illustrates, in a timing chart, a sequence of events when a task uses the memory co-processor of FIG. 2A to access a specific location in external memory.

In executing a "read-modify-write" instruction (also called "read-modify-write" function), co-processor 201 supplies the specified address on bus 204 to fetch data (e.g. a counter) from memory on bus 205 and issues a read request (see time t201 in FIG. 2B), receives the data from memory (see time t202), performs the specified instruction (or function) on the data (e.g. incrementing) thereby to obtain modified data, and writes the modified data back to the memory via bus 206 (see FIG. 2A) e.g. at the same location 207 (see time t203 in FIG. 2B). The time delay from t201 to t202 may be several clock cycles, e.g. 8 clock cycles depending on the latency of the external memory and memory interface hardware.

Figure 1A:
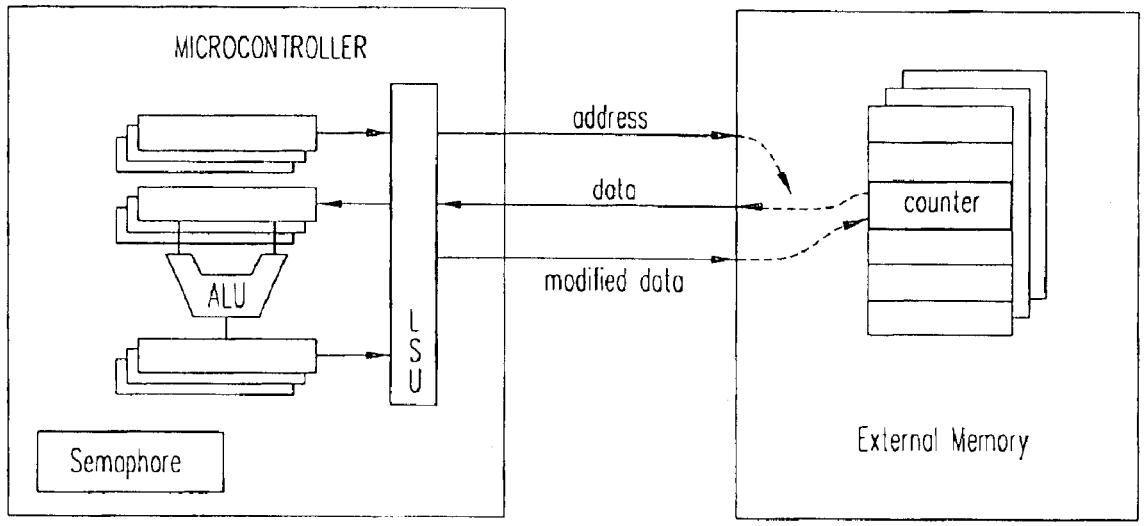
FIG. 1A is a prior art diagram showing use of a semaphore by multiple tasks to synchronize access to a common memory location.
Figure 1C:
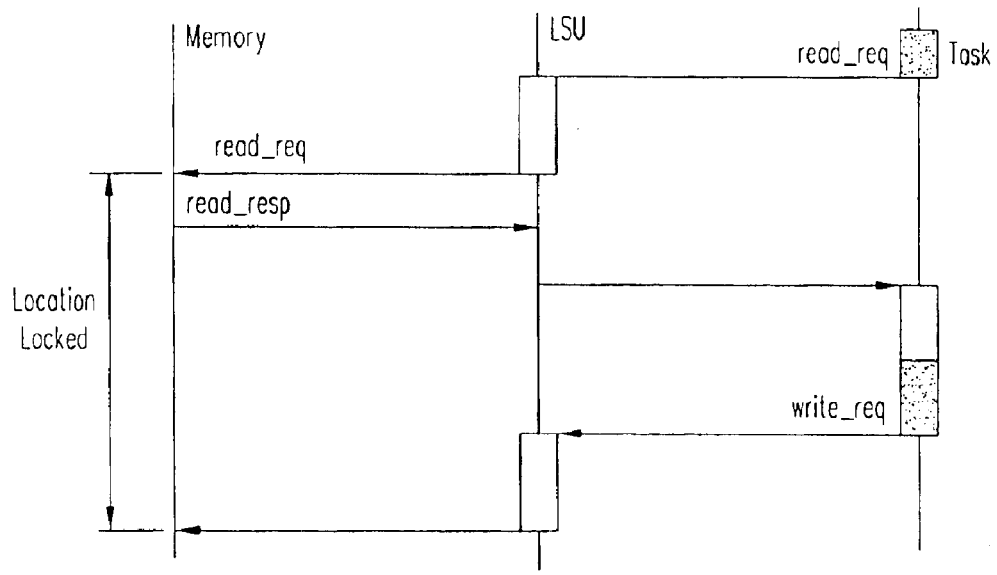
FIG. 1C illustrates, in another prior art timing chart, latency added by the presence of a load store unit.
Figure 1B:
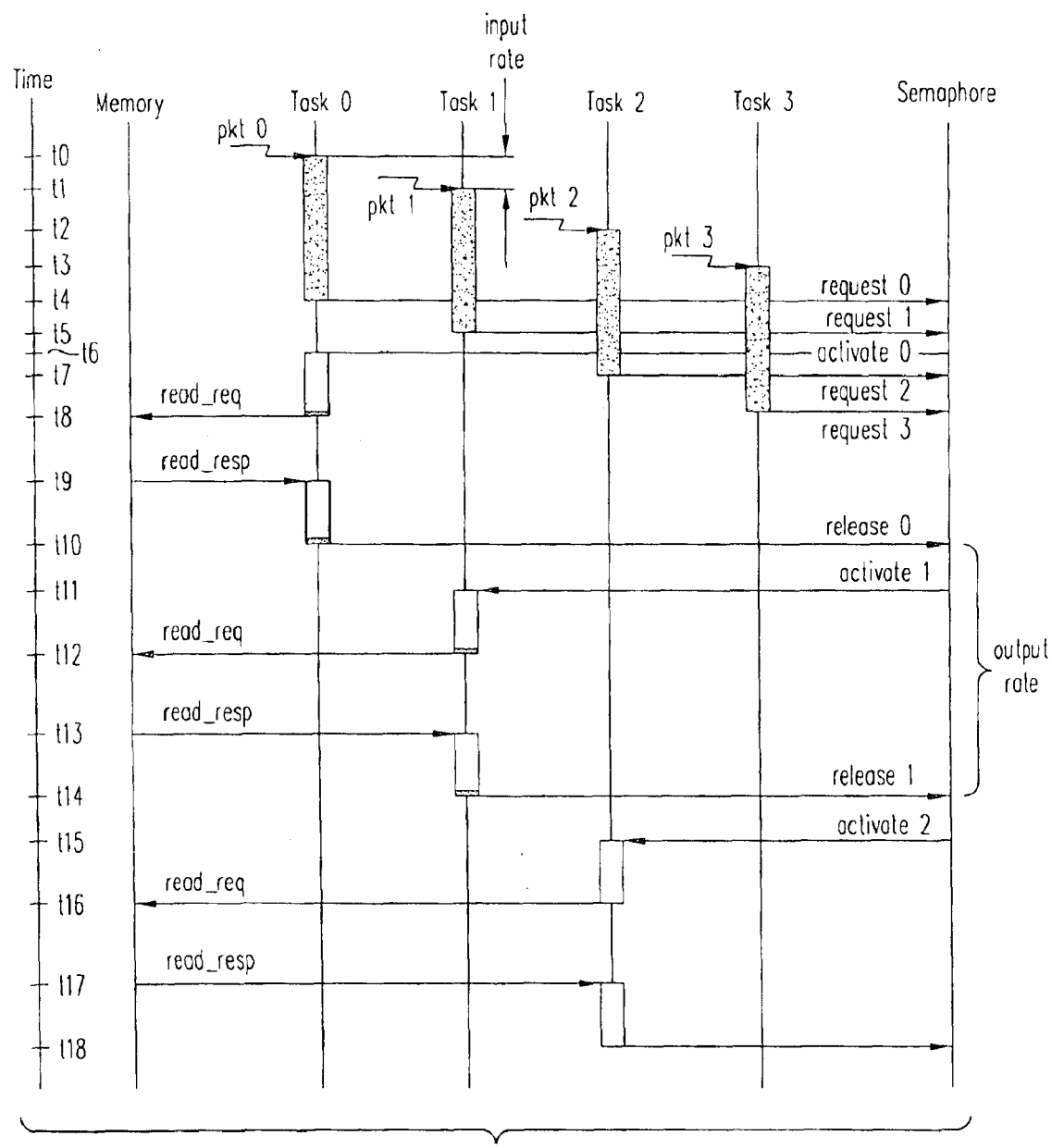
FIG. 1B illustrates, in a prior art timing chart, the simultaneous performance of multiple tasks until requesting a semaphore.

Instead of one or more casks in microcontroller 203 directly accessing external memory, use of a co-processor 201 to perform such access allows the access to be performed in a pipelined manner. Therefore, use of a co-processor 201 has several advantages, e.g. eliminates reduction in throughput caused by (1) serially acquiring a semaphore to enter critical region, and subsequent release of the semaphore, (2) latency of a load-store-unit or other memory management hardware used by the microcontroller (see FIG. 2B) which causes a larger critical section, and (3) latency in execution of instructions in the critical section, which may be caused by, for example, need to wake up a task (see the delay in waking up Task0 between times t6 and t8 in FIG. 1B). Another advantage is that a single command can be issued by the microcontroller in a single cycle, thereby saving clock cycles in the execution of software in the microcontroller.

Other advantages are discussed n, for example, the above-described patent application, Ser. No. 10/117,452 incorporated by reference above.

Figure 2C:
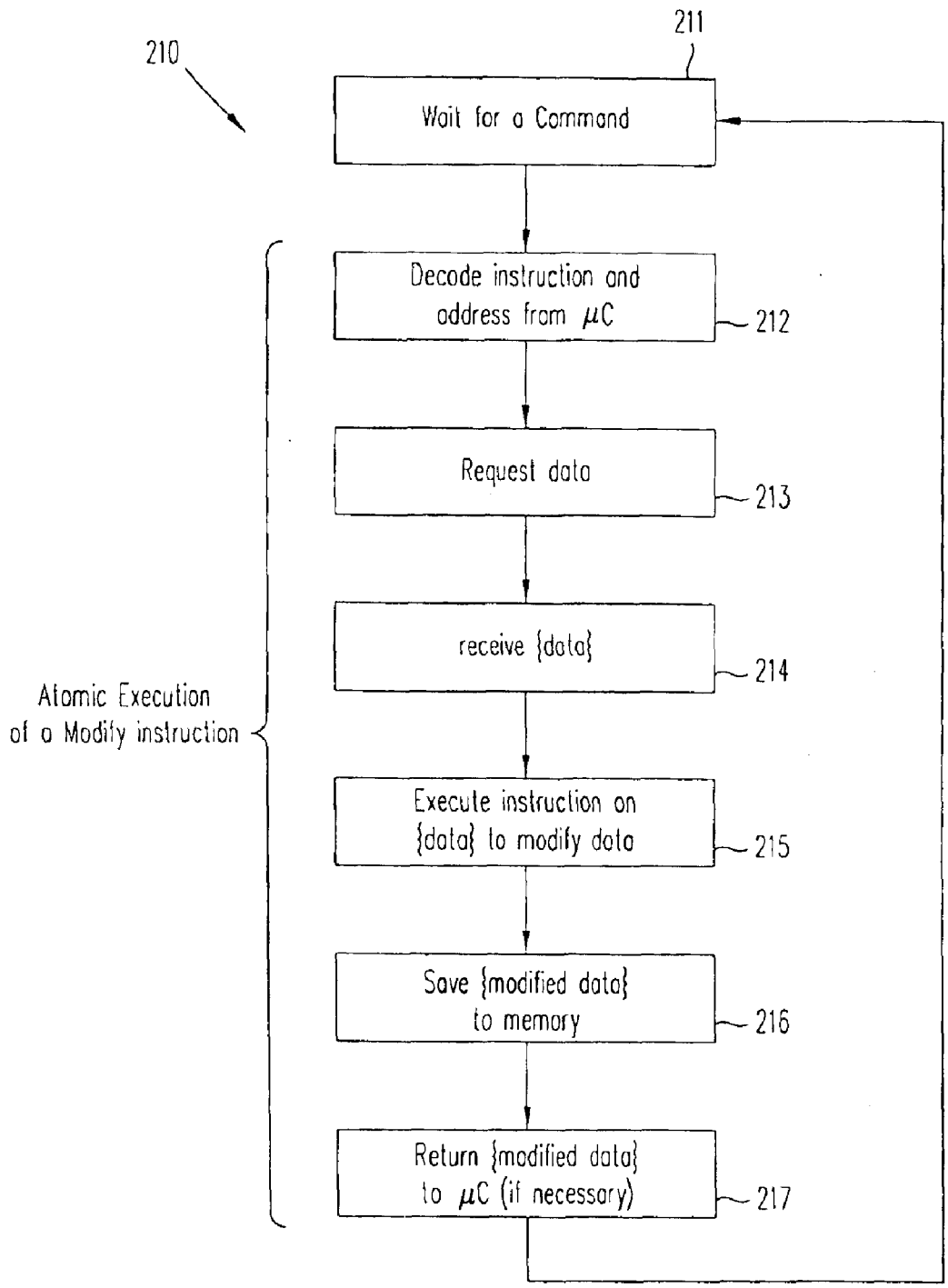
FIG. 2C illustrates, in a flow chart, acts performed atomically in accessing memory, by one embodiment of a memory co-processor of FIG. 2B.

In one embodiment, co-processor 201 waits to receive a command (as per act 211 in FIG. 2C) from a microcontroller 203. As discussed above, the command includes at least the following: an address of a memory location 207 in external memory, and an instruction (or function) to be performed on data held at that location. Co-processor 201 executes the instruction by performing a sequence of acts 212–217 in an atomic manner (i.e. uninterrupted). The atomic execution of each command ensures that data being modified by one command is not inadvertently used by another command. In this manner, co-processor 201 performs the function of a semaphore.

Specifically, in act 212, co-processor 201 decodes the instruction and the address received from the microcontroller. Next, in act 213 co-processor 201 requests data from external memory, by supplying the received address thereto. Then in act 214, co-processor 201 receives the requested data from external memory. In act 215, co-processor 201 executes the specified instruction on the retrieved data. Depending on the application, the instruction may be as simple as e.g. incrementing a counter, or as complex as e.g. a single policing function or dual policing function.

In act 216, co-processor 201 saves the modified data to external memory, typically at the same location 207 although other locations may be used, depending on the application. Moreover, depending or the type of instruction (whether the instruction is store and load, or simply store), the modified data is returned to the microcontroller, in act 217. On completion of acts 212–217, co-processor 201 returns to act 211 to wait for another command. If during performance of acts 212–217 another command has already been received, then no waiting is required in act 211 and instead co-processor 201 directly performs acts 212–217.

Note that such a "to-be-performed" command may be either buffered in a buffer in co-processor 201B (as described below in reference to FIG. 5A), or alternatively may be buffered in microcontroller 202. Depending on the implementation, such a buffer may hold just one to-be-performed command or several to-be-performed commands, e.g. 10 commands.

In one embodiment, a memory co-processor 201A locally stores the address and data being written to external memory, in a buffer 220 (hereinafter "address-data" buffer). In such an embodiment, memory co-processor 201A performs all of the acts 211–217 of method 210 (FIG. 2C) except with the following differences. After act 214, memory co-processor 201A checks ir act 214A whether an address of the data currently being used is present in the address-data buffer 220. If so, memory co-processor 201 decides to use the data from buffer 220 (see act 214B), and goes to act 215. If the address is not found in buffer 220, memory co-processor 201A simply goes to act 215. Moreover, method 300 (FIG. 3B) includes another act 216A subsequent to act 215, wherein co-processor 201A stores in buffer 220 the data obtained from act 215 as well as the address of the memory location at which the data is to be stored. Performance of act 216A ensures that data being modified in the current cycle is available in the next cycle in buffer 220 for use in act 215 (e.g. as per decision in act 214B).

Figure 4A:
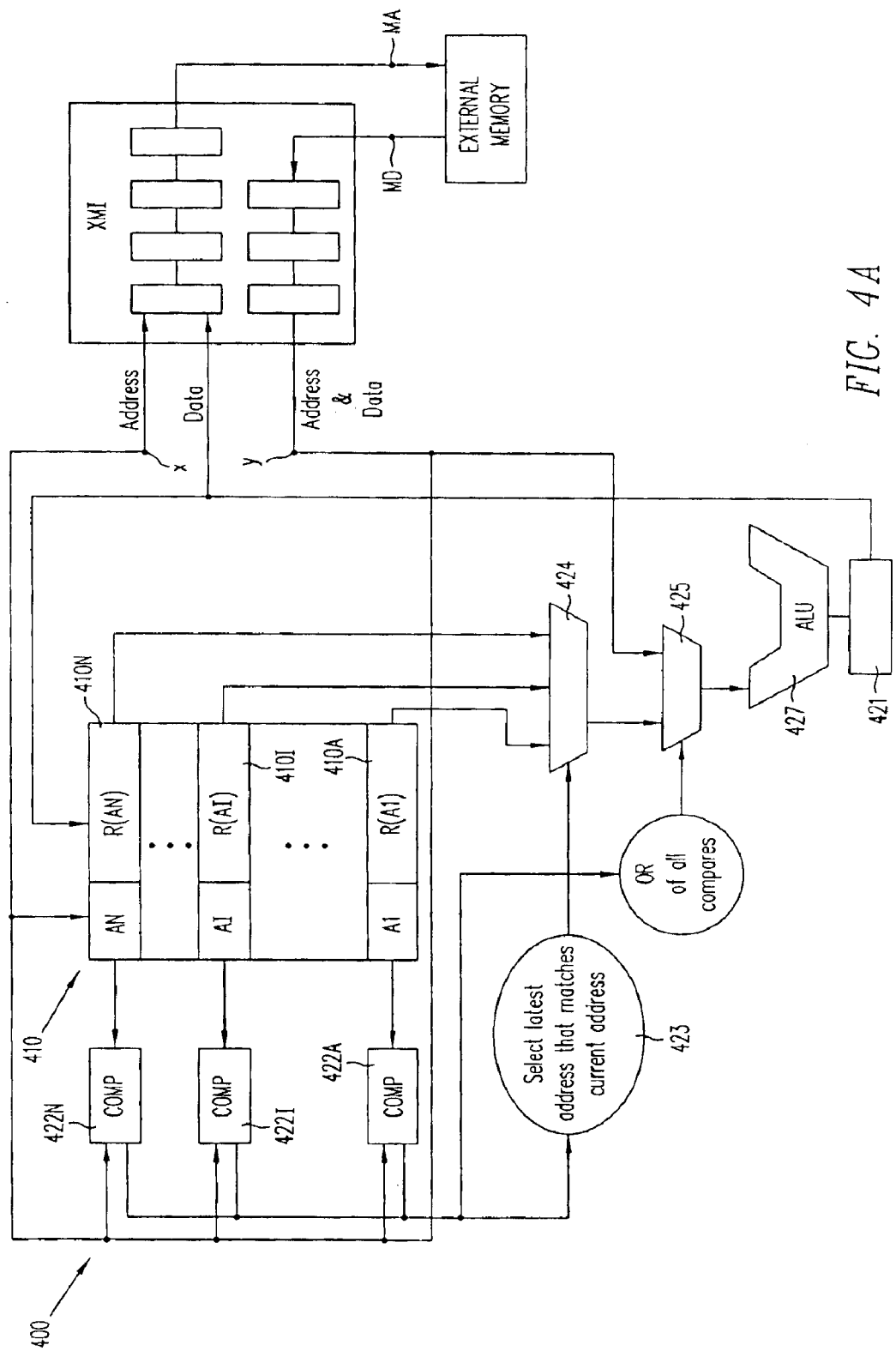
FIG. 4A illustrates, in a low-level block diagram, one implementation of the memory co-processor of FIG. 3A that uses a FIFO to implement the address-data buffer.

Buffer 220 may be implemented as a memory 410 (FIG. 4A), wherein each storage element I holds at least two items of information: (1) address AI and (2) data RAI. The data that is held is the result of performance of act 215 on the original data DI. In addition to buffer 220 (which is implemented ir. FIG. 4A as memory 410), the execution unit 400 in a memory co-processor of the type described herein also includes a number of comparators 422A–422N coupled to memory 410. Although comparators 422A–422N are shown as being able to read every storage element in memory 410, the storage elements 410A–410N are organized in a First-In-First-Out manner, as discussed below.

Comparators 422A–422N receive as one input the values of addresses A1–AN (wherein $1 \leq I \leq N$) from memory 410, and as another input an address of data that has just been retreived from the external memory (see point labeled Y in FIG. 4A). In the example illustrated in FIG. 4A, the external memory is coupled to the memory co-processor via external memory interface hardware XMI. External memory interface hardware XMI is a programmable controller which allows connection of the memory co-processor to several of the various types of static random access memory (SRAM) or several other devices (e.g. a field programmable gate array).

The result of comparison by comparators 422A–422N is used by a combinational logic 423 to generate a select signal for a multiplexer 424. Multiplexer 424 receives, as inputs, the results RA1–RAN held in FIFO memory 410. The output signal from multiplexer 424 is provided as a first input to another multiplexer 425 that receives, as second input, the data from external memory. Multiplexer 425 selects between the data from external memory and data from FIFO memory 410 based on a select signal generated by combinational logic 426 which logically ORs the output from comparators 422A–422N. In this manner, the most current version of data is provided to an arithmetic logic unit 427 which in turn stores its output in a register 421 that in turn supplies the output to memory 410, as well as to external memory.

The number N of storage elements in memory 410 is selected to be greater than or equal to the number of clock cycles of latency in writing the modified data to memory and reading back the written data, including, for example, latency imposed by external memory interface hardware XMI (FIG. 4A). XMI has several registers (in one specific example, there are 4 registers) in the data path for writing the data to external memory, and several additional registers (in one specific example, there are 3 registers) in the data path for reading the data from external memory.

This example is illustrated in FIGS. 4B and 4C (wherein the chart in FIG. 4C is a continuation (on the right side) of the chart of FIG. 45). As illustrated in FIG. 4B, if there is a latency of 8 cycles, no data returns for up to 8 cycles, and during this time, co-processor 201A may issue up to eight reads (in response to receipt of eight back-to-back commands), for the corresponding addresses A1–A8.

In this embodiment, the addresses A1–A8 may all be identical or may all be different, and regardless of the inequality or equality of address values, all eight reads are issued to the external memory. In the next clock cycle, another command is received for address A9 (from the microcontroller), and also received during this clock cycle is the data D1 for the first address A1. Co-processor 20A processes data D1 (in the absence of a hit in FIFO memory 410, because at this stage, all storage elements are "empty"). The result RA1 is then stored with address A1 in the first storage element in FIFO memory 410, and the same result RA1 is also written to memory, at address A1.

In the next clock cycle, data D2 for the second address A2 is received, and co-processor 201A processes L4 data D2 (first by checking for a hit in FIFO memory 410, because at this stage, address A1 is present therein). If A1 is same as A2, then the data RA1 is used instead of D2, in computing the new result RA2. Alternatively, if A1 is different from A2, then the data D2 is used in computing the result RA2. At this stage, FIFO memory 410 moves A1 and RA1 into the second storage element therein, thereby making room for storage of A2 and RA2 in the first storage element.

The just-described process is repeated at every clock cycle, with each item of data D1 retrieved from memory. Note that when there is more than one match for an address A1 in FIFO memory 410, the most recent item of data from among all matching storage elements is used in computing the new result RAI. Eight clock cycles after receipt of D1, the data item D9 is received, and in the new clock cycle, address A9 is compared against addresses A1–A8, and if found then the corresponding RAI is used.

In this manner, use of a local buffer 220 (FIG. 3A) permits two or more instructions to be performed back to back in successive clock cycles, despite latency of the memory, because the result of performing an instruction is temporarily held locally, at least until completion of writing of the modified data to external memory. Such use of data from the address-data buffer eliminates the possibility that stale data from memory may be used, e.g. if a read for data (to be used in an instruction being executed in the current clock cycle) was issued several clock cycles ago, and new data has been written to memory in a clock cycle immediately preceding the current clock cycle.

Although optional, in some embodiments, a command is buffered by memory co-processor 201B, in a buffer 501 (also called "command buffer") that has sufficient space to hold the task identity (in addition to the to-be-executed instruction, and the address of data on which the instruction is to be executed). In some such embodiments, buffer 501 has storage elements organized in a First-In-First-Our (FIFO) manner, although other organizations may be used in other embodiments.

Regardless of the organization, if present, command buffer 501 (FIG. 5B) includes a number of storage elements in which a corresponding number of commands (along with their specified addresses and if present task ids) may be temporarily held, while one such command is being performed. Buffering of commands in this manner allows a number of tasks to supply to the memory co-processor 201B a corresponding number of commands, back to back, in successive clock cycles, even if an execution unit 502 in co-processor 201B is busy with execution of another instruction. For example, as illustrated in FIG. 4B, no reads can be issued by the memory co-processor, e.g. when the results RA1–RA9 are being written to memory. Any commands that arrive during this time may be temporarily held in command buffer 501 or alternatively a signal may be sent by the memory co-processor to the microcontroller to prevent transmission of commands therefrom during this time.

Note that the processing of such commands by memory co-processor 201B (FIG. 5A) need not result in back-to-back locking of locations in the external memory (as illustrated in DIG. 5C), e.g. if there is no address-data buffer of the type described above in reference to FIG. 3A. The presence of an address-data buffer in a memory co-processor supports back to back locking of memory locations, and maximum throughput by issuance or a number of reads/writes to the external memory in successive clock cycles.

In some embodiments, a memory co-processor 201B is used with a microcontroller 203 that executes a number of tasks in a multi-tasking manner (as described in, for example, U.S. Pat. No. 6,330,584 that is incorporated by reference herein in its entirety; for example, see FIG. 6 of this patent). In such a system, depending on the type of command (e.g. whether the command is "store-and-load" or simply "store"), memory co-processor 201B receives, in addition to address and instruction, an identifier of a task and an identifier of a register in microcontroller 203, e.g. on command bus 202B. Moreover, memory co-processor 201B provides the task identifier and the register identifier on bus 208D to microcontroller 203, so that the appropriate task may be awakened and the appropriate register used to hold the result.

Numerous modifications and adaptations of the embodiments, examples, and implementations described herein will be apparent to the skilled artisan in view of the disclosure. For example, in some systems, memory co-processor 201B may receive only one of the above-described two identifiers: an identifier of a task and an identifier of a register.

As another example, in some embodiments, instead of a single microcontroller, a number of microcontrollers are coupled to, and use a single memory co-processor to access a common memory. All tasks, regardless of the specific microcontroller in which they are executing, issue their instructions for accessing a common memory location to the single memory co-processor, thereby to implement a semaphore function. In such embodiments, the memory co-processor receives, in addition to the task identifier, an identifier of the microcontroller in which the task is executing, so that the same task is awakened after execution of the instruction.

In certain embodiments, a memory co-processor may contain a number of processing units that perform a corresponding number of commands in parallel (e.g. out of order), with the commands identifying different addresses in memory, and the memory being multi-ported to support the multiple processing units.

As another example, an address-data buffer can also be used to eliminate a stall during execution of a current instruction, pending completion of writing to memory of the modified data of a previous instruction and the written data to be read back, thereby to avoid the delay imposed by memory latency on the back to back execution of successive instructions accessing the same memory location.

Furthermore, although in the example illustrated in FIGS. 4B and 4C the memory is assumed to have only one data bus (as in, for example, Zero Bus Turnaround (ZBT) memory), other examples may use memory having two data buses (as in, for example, quad data rate (QDR) memory) so that both buses are 100% busy, at least a majority of the time. Note that use of any of these types of memory is supported by an external memory inteface hardware, which may impose its own latency, although the throughput is increased.

Figure 3A:
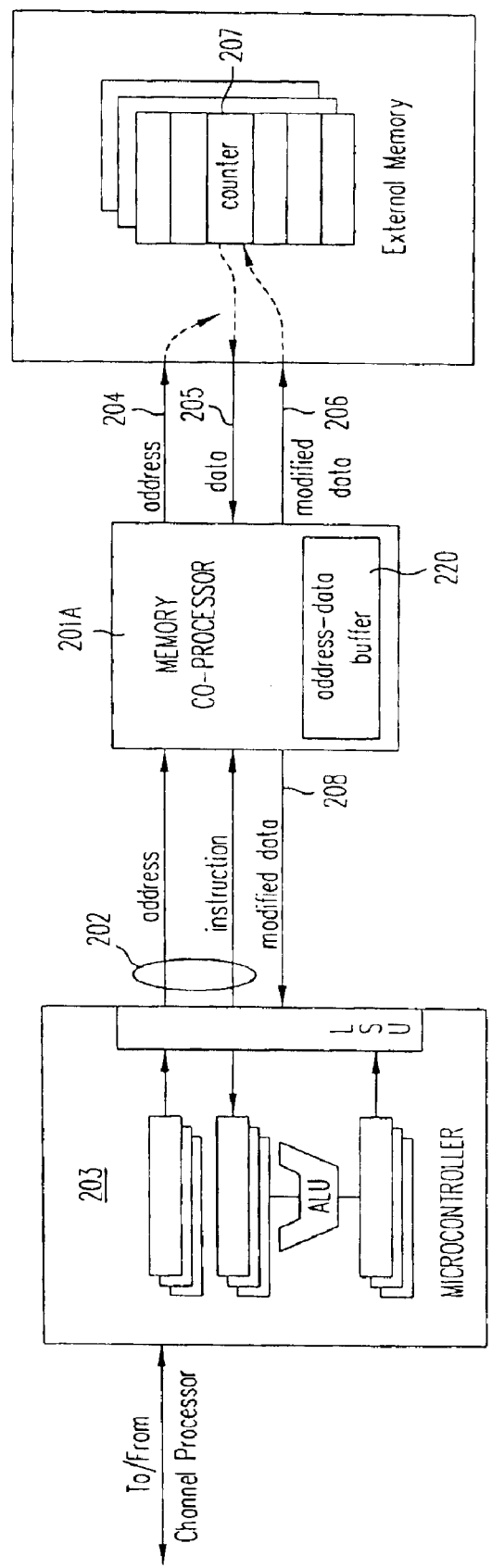
FIG. 3A illustrates, in a block diagram, one embodiment of the memory co-processor of FIG. 2A that includes an address-data buffer used to avoid stale data retrieved from external memory.
Figure 3B:
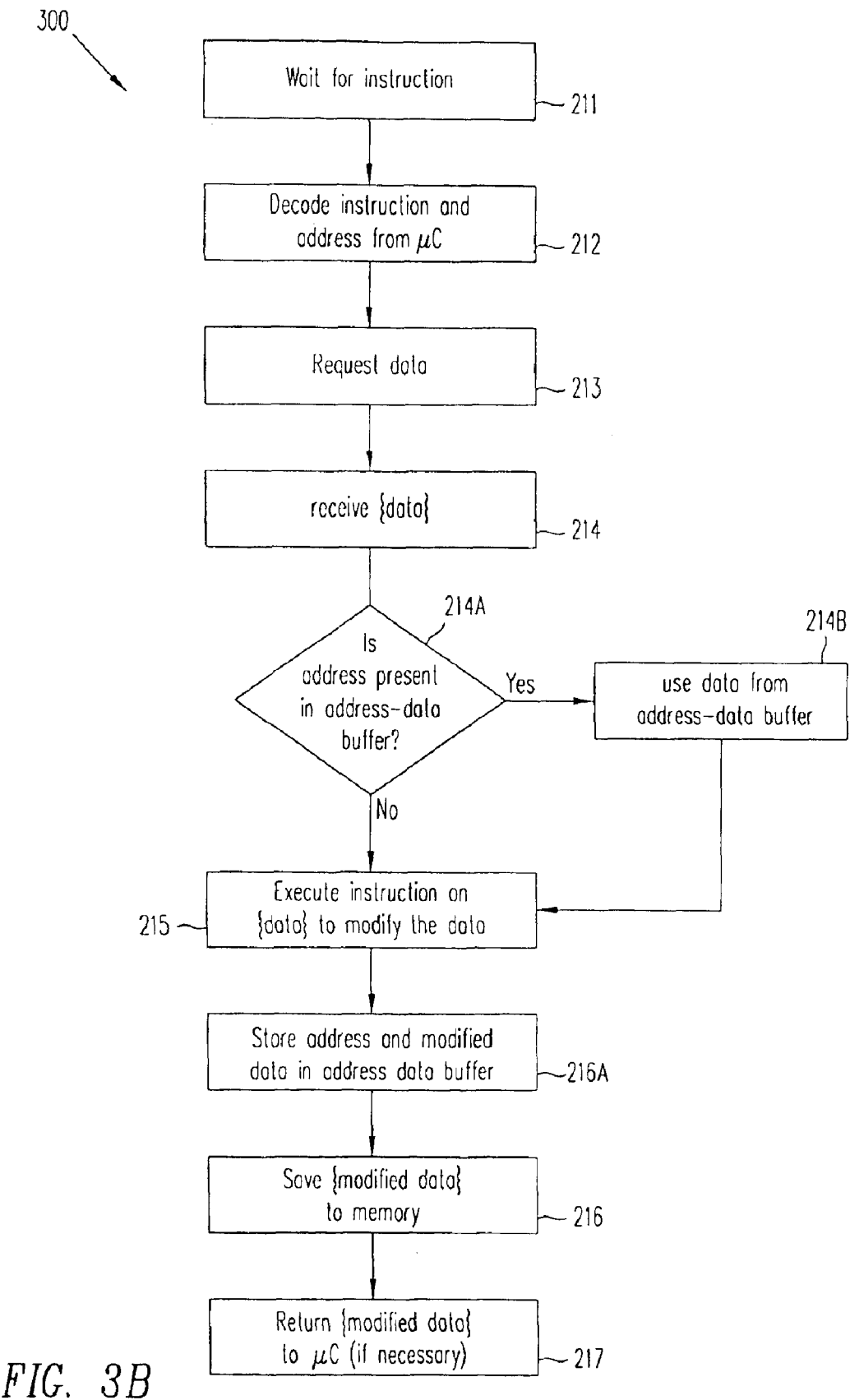
FIG. 3B illustrates, in a flow chart, acts performed atomically in accessing memory, by one embodiment of a memory co-processor of FIG. 2B.
Figure 5A:
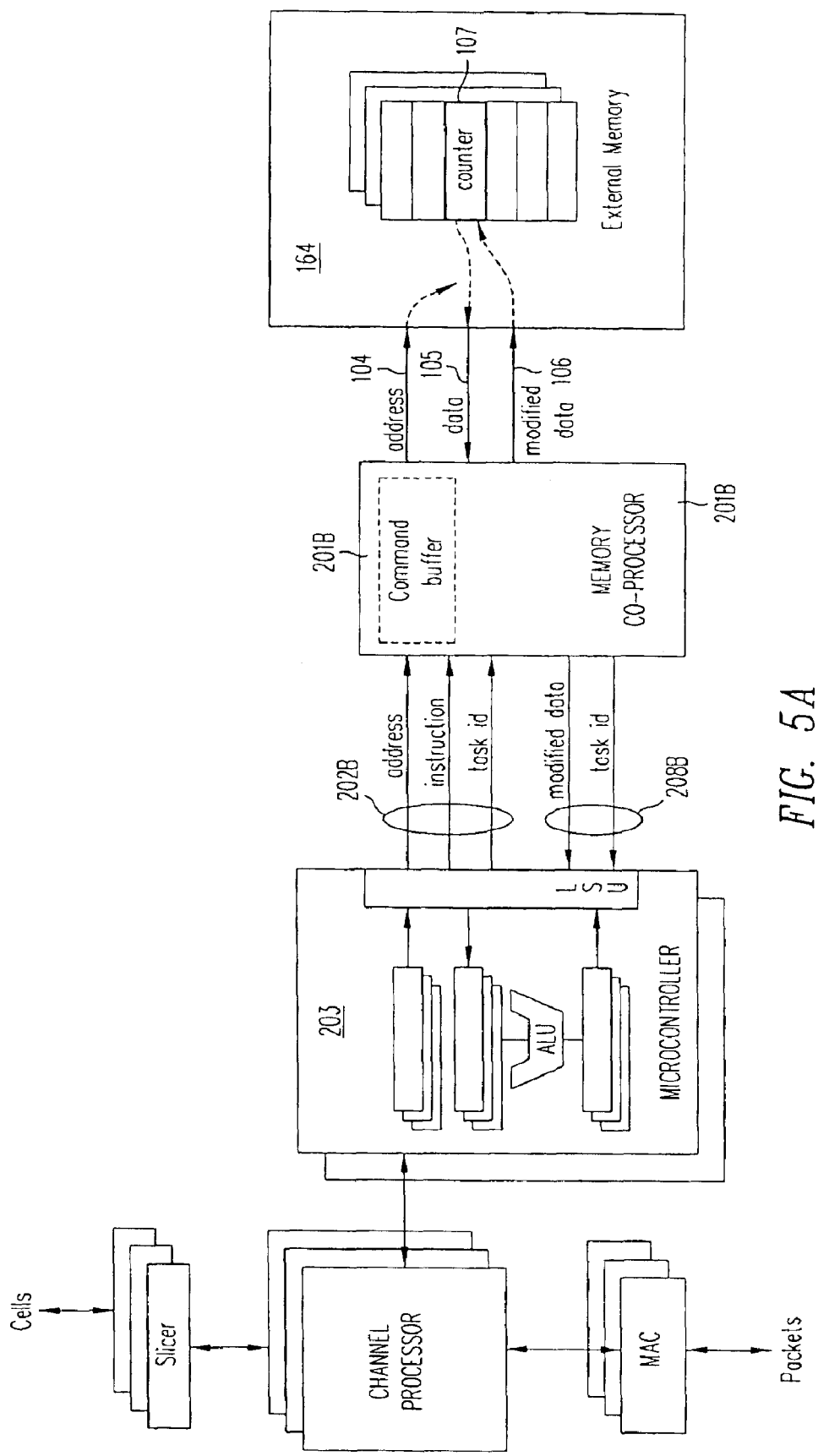
FIG. 5A illustrates, in a block diagram, one embodiment of the memory co-processor of FIG. 2A that includes a command buffer to temporarily hold commands during execution of other commands.
Figure 5B:
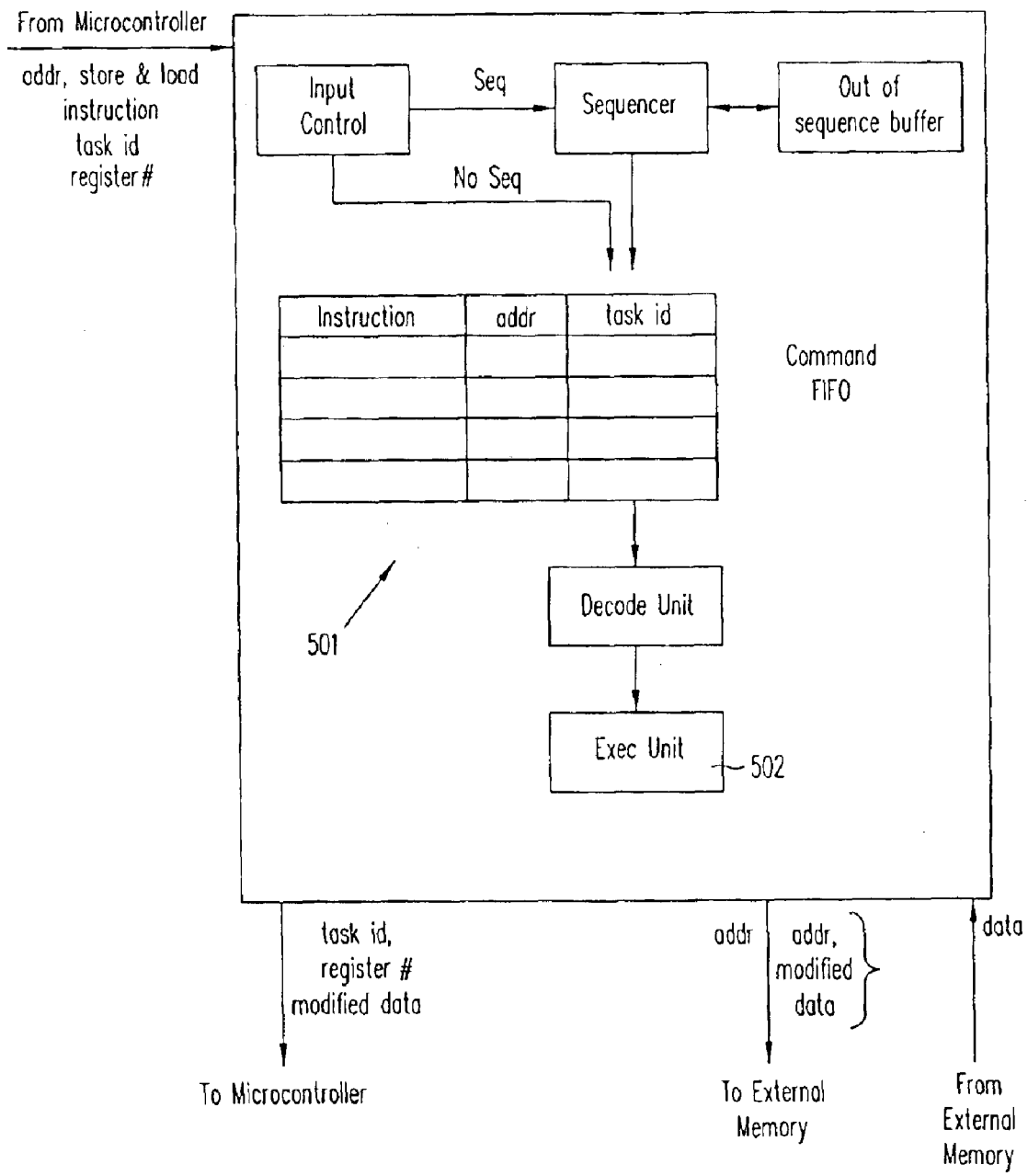
FIG. 5B illustrates, in a low-level block diagram, one implementation of the memory co-processor of FIG. 5A that uses a FIFO to implement the command buffer, a sequencer to reorder commands that are received out of sequence, and another buffer used by the sequencer to temporarily hold out-of-sequence commands.
Figure 5C:
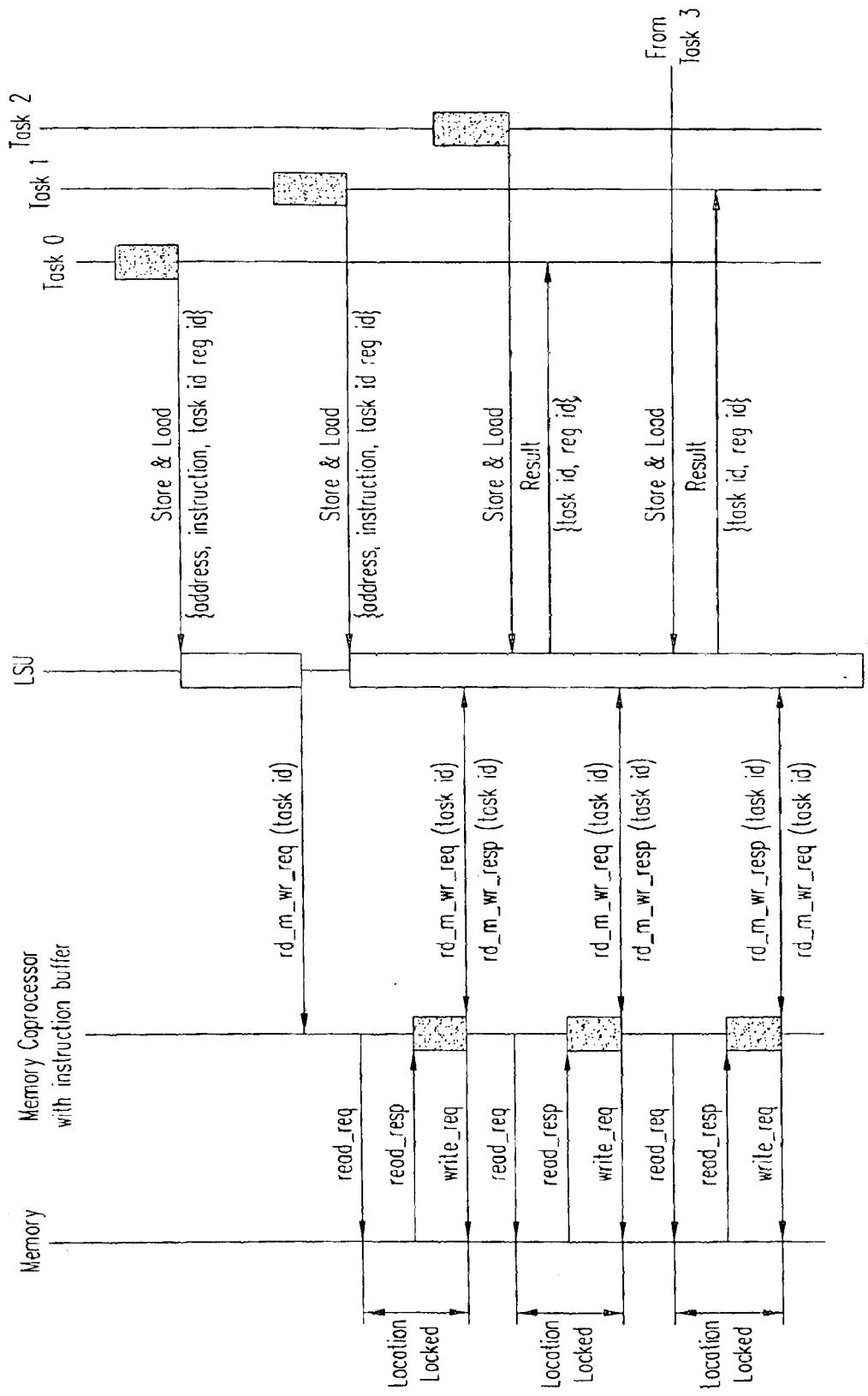
FIG. 5C illustrates, in a timing chart, a sequence of events when multiple tasks use the memory co-processor of FIG. 5B to access a specific location in external memory.

Although in FIGS. 3A and 5A, a memory co-processor is individually shown as having an address-data buffer, and a command buffer respectively, in certain embodiments, a memory co-processor has both buffers. One such embodiment has, in addition to the just-described two buffers, an out-of-sequence buffer to hold commands that are received out of sequence. Furthermore, in another embodiment of the type illustrated in FIG. 5B, a command FIFO 501 is not needed, e.g. if the speed of accessing memory is greater than the rate at which commands arrive into the memory co-processor.

Numerous such modifications and adaptations of the embodiments described herein are encompassed by the attached claims.

What is claimed is:

1. A co-processor for interfacing a microcontroller to an external memory, the co-processor comprising:

a first bus, coupled to the microcontroller, for carrying from the microcontroller to the co-processor, a command identifying at least an instruction to change data in the external memory, an address of the data in the external memory, and an identifier of a task that issues the instruction, the first bus comprising an instruction bus for carrying the instruction, an address bus for carrying the address, and a task identifier bus for carrying the identifier;

an execution unit comprising an arithmetic logic unit, the execution unit being coupled to the first bus through the command buffer, wherein the execution unit performs a sequence of acts in an atomic manner to execute at least the instruction identified in the command, and wherein the sequence of acts includes decoding at least the instruction;

a command buffer, coupled to the first bus, to hold the command temporarily if the execution unit is processing a previous command;

a second bus, coupled to the external memory, for transmitting to the external memory, the address and the data to be stored at the address in the external memory;

an address-data buffer coupled to the execution unit and capable of locally storing changed data obtained from the arithmetic logic unit by execution of said instruction from the first bus;

wherein the address-data buffer includes a number of storage elements greater than or equal to the number of clock cycles of latency of the external memory;

a third bus, coupled to the external memory, for receiving from the external memory, the address and the data held at the address in the external memory;

a comparator coupled to each of the third bus and the address-data buffer to generate a select signal indicative of a most current version of the data;

a multiplexer coupled to each of the third bus and the address-data buffer, to selectively pass to the arithmetic logic unit the most current version of the data, in response to the select signal from the comparator; and a fourth bus, coupled to the microcontroller, for carrying to the microcontroller from the co-processor, the identifier of the task and said changed data.

2. The co-processor of claim 1 wherein:
the command buffer is organized in a First-In-First-Out (FIFO) manner.

3. The co-processor of claim 1 wherein:
the instruction is a read-modify-write instruction.

4. The co-processor of claim 1 wherein:
execution of the instruction is pipelined.

5. The co-processor of claim 1 wherein:
the instruction comprises incrementing.

6. The co-processor of claim 1 wherein:
the instruction comprises a policing function.

7. The co-processor of claim 1 wherein:
the instruction comprises a dual policing function.

8. The co-processor of claim 1 wherein the first bus comprises:
lines to receive an identifier of a register from the microcontroller.

9. The co-processor of claim 1 further comprising:
a comparator coupled to each of the third bus and the address-data buffer to generate a select signal indicative of a most current version of the data; and a multiplexer coupled to each of the third bus and the address-data buffer, to selectively pass to the arithmetic logic unit the most current version of the data, in response to the select signal from the comparator.

10. A method of interfacing to an external memory, the method comprising:

receiving, from a plurality of tasks in a microcontroller, a corresponding plurality of commands to be performed on shared data held in the external memory, each command identifying at least an instruction to change the data, an address of the data and an identity of a task that issues the instruction;

issuing a plurality of addresses to the external memory, in successive clock cycles;

receiving, from the external memory, data for each command in the corresponding plurality of commands;

wherein at least one additional command is received from the microcontroller during receipt of said data;

executing each instruction, using an arithmetic logic unit;

locally storing changed data obtained from the arithmetic logic unit by execution of said instruction; and supplying to the microcontroller, the changed data and the identity of the task that issued the instruction.

11. The method of claim 10 further comprising:
checking for local presence of the modified data for use in a later instruction.

12. The method of claim 10 further comprising:
locally storing the plurality of commands, prior to execution; and the act of executing is performed on each instruction one at a time, to synchronize access to a common memory location.

13. The method of claim 10 wherein:
during said executing the data is incremented.

14. The method of claim 10 wherein:
during said executing a policing function is performed.

15. The method of claim 10 wherein:
each command also identifies a register.

16. A co-processor for interfacing a microcontroller to an external memory, the co-processor comprising:

a first bus, coupled to the microcontroller, for carrying from the microcontroller to the co-processor, a command identifying at least an instruction to change data in the external memory, an address of the data in the external memory, and an identifier of a task that issues the instruction, the first bus comprising an instruction bus for carrying the instruction, an address bus for carrying the address, and a task identifier bus for carrying the identifier;

an execution unit comprising an arithmetic logic unit, the execution unit being coupled to the first bus through the command buffer, wherein the execution unit performs a sequence of acts in an atomic manner to execute at least the instruction identified in the command, and wherein the sequence of acts includes decoding at least the instruction;

a sequencer coupled to the first bus, to receive a plurality of commands including said command, and to reorder commands in said plurality that are received out of sequence;

an out-of-sequence buffer used by the sequencer to temporarily hold out-of-sequence commands;

a command buffer, coupled to the sequencer, to hold the plurality of commands temporarily if the execution unit is processing a previous command;

a second bus, coupled to the external memory, for transmitting to the external memory, the address and the data to be stored at the address in the external memory;

an address-data buffer coupled to the execution unit and capable of locally storing changed data obtained from the arithmetic logic unit by execution of said instruction from the first bus;

wherein the address-data buffer includes a number of storage elements greater than or equal to the number of clock cycles of latency of the external memory;

a third bus, coupled to the external memory, for receiving from the external memory, the address and the data held at the address in the external memory; and a fourth bus, coupled to the microcontroller, for carrying to the microcontroller from the co-processor, the identifier of the task and said changed data.

* * * * *

UNITED STATES PATENT AND TRADEMARK OFFICE
CERTIFICATE OF CORRECTION

PATENT NO. : 6,938,132 B1  Page 1 of 1
APPLICATION NO. : 10/117779
DATED : August 30, 2005
INVENTOR(S) : Joffe et al.

It is certified that error appears in the above-identified patent and that said Letters Patent is hereby corrected as shown below:

Column 5
Line 1 "casks" should be -- tasks --.
Line 18 " n," should be -- in, --.
Line 47 "or" should be -- on --.

Column 6
Lines 1 and 20 "ir" should be -- in --.
Line 66 "45" should be --4B--.

Column 7
Line 17 "L4" should be deleted.
Line 27 "D1" should be -- DI --.
Line 29 "A1" should be --AI--.
Line 54 "First-In-First-Our" should be -- First-In-First-Out --.

Column 8
Line 10 "DIG." should be -- FIG. --.
Line 28 "208D" should be -- 208B --.

Signed and Sealed this

Sixteenth Day of October, 2007

JON W. DUDAS
*Director of the United States Patent and Trademark Office*